(12) United States Patent
Celinski et al.

(10) Patent No.: US 7,539,889 B2
(45) Date of Patent: May 26, 2009

(54) MEDIA DATA SYNCHRONIZATION IN A WIRELESS NETWORK

(75) Inventors: Tomasz Celinski, Elizabeth Bay (AU);
Peter Celinski, Bangor (AU); Stuart Bryce, Crows Nest (AU); Max Gordon Ramsay, Balmain (AU); Adam J. Kent, Lilyfield (AU); Adam Kaczynski, Quakers Hill (AU)

(73) Assignee: Avega Systems Pty Ltd, McMahons Point, NSW (AU)

( * ) Notice: Subject to any disclaimer, the term of this patent is extended or adjusted under 35 U.S.C. 154(b) by 153 days.

(21) Appl. No.: 11/559,360

(22) Filed: Nov. 13, 2006

(65) Prior Publication Data

US 2007/0226530 A1 Sep. 27, 2007

Related U.S. Application Data

(60) Provisional application No. 60/755,243, filed on Dec. 30, 2005.

(51) Int. Cl.
*H04L 7/00* (2006.01)
*G06F 1/00* (2006.01)
*G06F 1/12* (2006.01)

(52) U.S. Cl. ................ 713/400; 713/500; 713/600

(58) Field of Classification Search ............ 713/400, 713/500, 600
See application file for complete search history.

(56) References Cited

U.S. PATENT DOCUMENTS

| 5,272,525 | A | 12/1993 | Borchardt et al. ............ 358/83 |
| 5,319,716 | A | 6/1994 | McGreevy .................... 381/79 |
| 5,349,386 | A | 9/1994 | Borchardt et al. ........... 348/485 |
| 5,406,634 | A | 4/1995 | Anderson et al. ............ 381/82 |
| 5,491,839 | A | 2/1996 | Schotz ........................ 455/66 |
| 5,721,738 | A * | 2/1998 | Kubota et al. ............... 370/508 |
| 5,822,381 | A * | 10/1998 | Parry et al. ................. 375/356 |
| 5,832,024 | A | 11/1998 | Schotz et al. ............... 375/200 |
| 5,946,343 | A | 8/1999 | Schotz et al. ............... 375/200 |

(Continued)

FOREIGN PATENT DOCUMENTS

CN 1710587 12/2005

(Continued)

OTHER PUBLICATIONS

Tom Blank and Robert Atkinson "Synchronization Strategies For IP Networked Home Audio Equipment," Microsoft Corp., Redmond, WA. Presented at the 2005 AES 19th UK Conference called "Convergence—The Impact of Computers and Networking on Future Audio Technology." Downloaded Apr. 10, 2006 at http://www.corinex.com/pdf/press/eng/microsoft.pdf.

(Continued)

*Primary Examiner*—Thomas Lee
*Assistant Examiner*—Ji H Bae
(74) *Attorney, Agent, or Firm*—Tarolli, Sundheim, Covell & Tummino LLP

(57) ABSTRACT

A method of keeping global time in a wireless network, the method comprising the steps of: using a first 802.11 chip set to read a Time Synchronization Function (TSF) to provide an initial time base; using an interconnected clock control circuit to read the TSF time directly from the 802.11 chip set and to implement a local clock based on time values read from the TSF function.

31 Claims, 9 Drawing Sheets

U.S. PATENT DOCUMENTS

| | | |
|---|---|---|
| 6,466,803 B1 * | 10/2002 | Gardner .................. 455/553.1 |
| 6,466,832 B1 | 10/2002 | Zuqert et al. .................. 700/94 |
| 6,608,907 B1 | 8/2003 | Lee ............................. 381/311 |
| 6,614,849 B1 | 9/2003 | Chan et al. .................. 375/259 |
| 6,747,996 B2 | 6/2004 | Holloway et al. ........... 370/503 |
| 6,868,161 B1 | 3/2005 | Yamada et al. ................. 381/1 |
| 6,954,641 B2 | 10/2005 | McKenna et al. |
| 7,023,883 B1 | 4/2006 | Lui et al. .................... 370/503 |
| 7,024,003 B2 | 4/2006 | Dupeire ........................ 381/79 |
| 7,031,329 B2 | 4/2006 | Lipsanen .................... 370/408 |
| 7,035,246 B2 * | 4/2006 | Taylor ......................... 370/350 |
| 7,058,089 B2 * | 6/2006 | Franchuk et al. ............ 370/503 |
| 2002/0150053 A1 | 10/2002 | Gray, III et al. ............. 370/252 |
| 2003/0056136 A1 | 3/2003 | Aweya et al. ................ 713/400 |
| 2004/0076435 A1 * | 4/2004 | Stolyarov et al. ............. 398/75 |
| 2004/0100942 A1 | 5/2004 | Blank et al. ................. 370/352 |
| 2004/0160928 A1 | 8/2004 | Perlman |
| 2004/0223622 A1 * | 11/2004 | Lindemann et al. ........... 381/79 |
| 2004/0252400 A1 | 12/2004 | Blank et al. .................... 360/70 |
| 2005/0131558 A1 | 6/2005 | Braithwaite et al. ........... 700/94 |
| 2005/0133764 A1 | 6/2005 | Joanicot et al. |
| 2005/0136839 A1 | 6/2005 | Seshadri et al. ............. 455/41.2 |
| 2005/0141469 A1 | 6/2005 | Miller et al. |
| 2005/0169193 A1 | 8/2005 | Black et al. |
| 2005/0192992 A1 | 9/2005 | Reed et al. .................. 707/101 |
| 2005/0195986 A1 | 9/2005 | McCarty et al. ............... 381/79 |
| 2005/0254661 A1 | 11/2005 | Castaneda et al. ............. 381/26 |
| 2005/0259754 A1 * | 11/2005 | Ho et al. ................. 375/240.28 |
| 2005/0288805 A1 | 12/2005 | Moore et al. |
| 2006/0132715 A1 | 6/2006 | Ho et al. ....................... 353/15 |
| 2006/0171544 A1 | 8/2006 | Chung ........................... 381/77 |
| 2006/0174116 A1 | 8/2006 | Balfanz et al. |
| 2006/0193273 A1 * | 8/2006 | Passier et al. ................ 370/310 |
| 2006/0287745 A1 | 12/2006 | Richenstein et al. .......... 700/94 |
| 2007/0003073 A1 | 1/2007 | Iriarte .......................... 381/77 |
| 2007/0192833 A1 | 8/2007 | Ho et al. |

FOREIGN PATENT DOCUMENTS

| | | |
|---|---|---|
| EP | 1380918 | 1/2004 |
| EP | 1 646 109 A1 | 4/2006 |
| GB | 2402302 | 8/2005 |
| JP | 2005-341618 | 12/2005 |
| JP | 2006-060615 | 3/2006 |
| TW | 246865 B | 1/2006 |
| WO | WO 03/096741 | 11/2003 |
| WO | WO 2005/115051 | 12/2005 |
| WO | WO 2006/089256 A2 | 8/2006 |

OTHER PUBLICATIONS

David L. Mills, "Network Time Protocol (Version 3): Specification, Implementation and Analysis," Network Working Group, Internet draft standard RFC 1305, Mar. 1992. Available online at: http://www.faqs.org/rfcs/rfc1305.html.

D. Mills, "Simple Network Time Protocol (SNTP) Version 4 for IPv4, IPv6 and OSI," Network Working Group, Internet draft standard RFC 2030, Oct. 1996. Available online at: http://www.faqs.org/rfcs/rfc2030.html.

DigiLinX, "Frequently Asked Questions," NetStreams L.L.C., Austin, TX, downloaded Sep. 29, 2005. Available online at: http://www.sirkom.com/NetStreams/DigiLinX/digilinx_faq.pdf.

Men Muheim, "Design and Implementation of a Commodity Audio System," PhD. Dissertation, ETH, Zurich, Switzerland, ETH Diss. No. 15198, 2003. Available online at: http://e-collection.ethbib.ethz.ch/ecol-pool/diss/fulltext/eth15198.pdf.

"Logitech Delivers 5.1 Surround Sound Without the Cables; With Dual Wireless Rear Speakers, Logitech Z-5450 Digital System Combines Power and Cordless Freedom; Logitech Z-4 2.1 Speakers Feature New 3-Driver Design," Business Wire, Fremont, CA, Sep. 7, 2005. Downloaded Sep. 28, 2005 from: http://www.tmcnet.com/usubmit/2005/sep/1179330.htm.

Dr. Men Muheim, "Design and Implementation of a Commodity Audio System," Audio Engineering Society Convention Paper, presented at the 116th, Convention, May 8-11, 2004, Berlin Germany.

T. Blank, B. Atkinson, M. Isard, J.D. Johnston and K. Olynyk, "An Internet Protocol (IP) Sound System," Audio Engineering Society Convention Paper, presented at the 117[h], Convention, Oct. 28-31, 2004, San Francisco, CA. Available online at: http://research.microsoft.com/users/misard/papers/aes2004.pdf.

"NetStreams Cooperates with Polk Audio to Introduce IP Networked Loudspeakers," NetStreams L.L.C., Austin, TX, Mar. 17, 2004. Downloaded Sep. 28, 2005 at: http://hometheaterhifi.com/forum/showthread.php?t=451.

"Audio/Video: NICT develops network-connectable speakers," TechJapan, Jun. 28, 2005. Downloaded Mar. 7, 2007. Available online at: http://www.techjapan.com/Article1022.html.

"StreamNet Technology: How Streamnet Makes A Difference," NetStreams L.L.C., Austin, TX, 2005. Downloaded Sep. 29, 2005 from: http://www.netstreams.com.

* cited by examiner

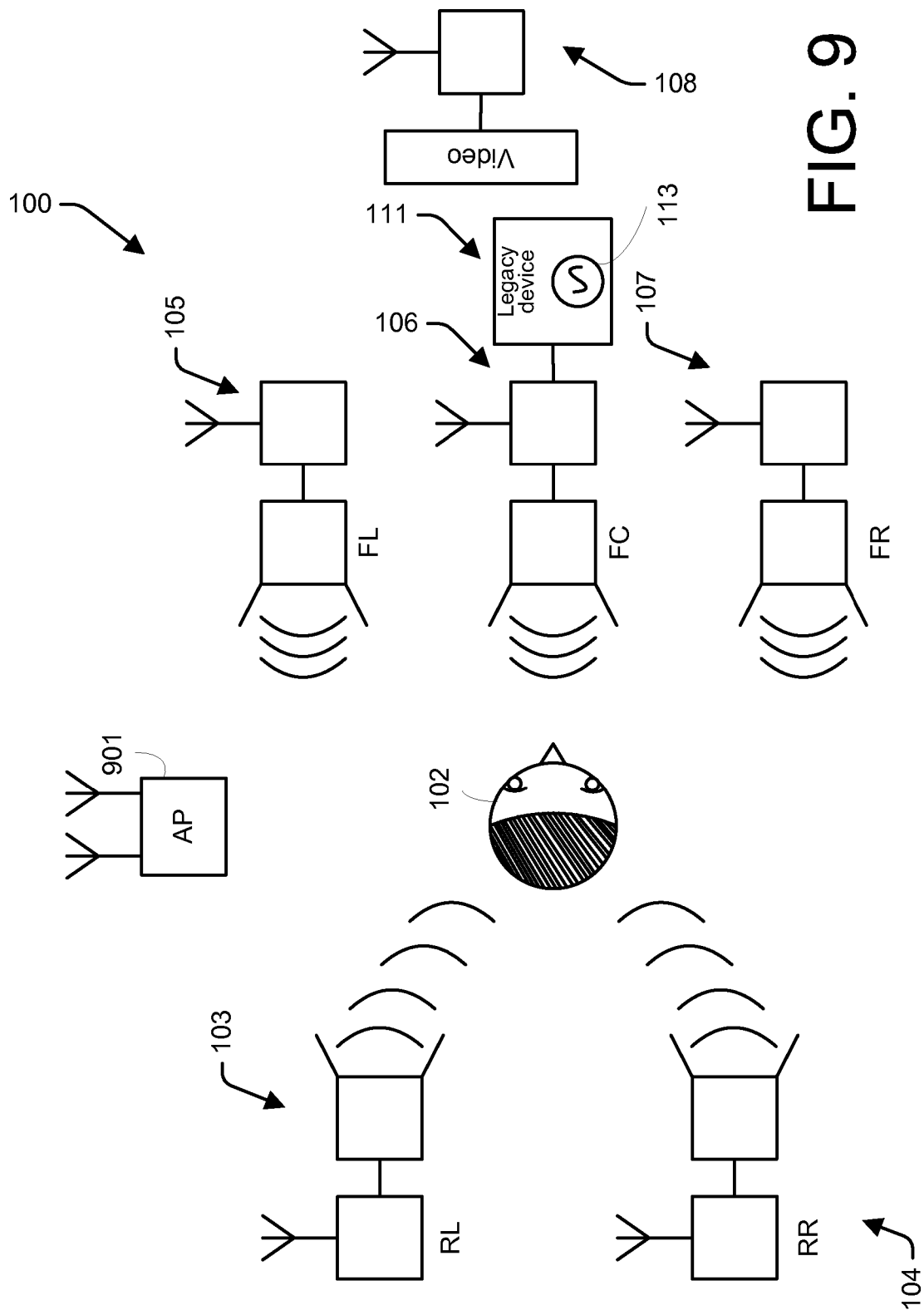

MEDIA DATA SYNCHRONIZATION IN A WIRELESS NETWORK

RELATED PATENT APPLICATION

The present application claims benefit of priority of and is a conversion of U.S. Provisional Patent Application 60/755,243 filed Dec. 30, 2005 to inventors Celinski et al., titled MEDIA DATA SYNCHRONIZATION IN A NETWORK ENVIRONMENT. The contents of Provisional Application 60/755,243 are incorporated herein by reference.

FIELD OF THE INVENTION

The present invention relates to synchronization of media streams for playback and, in particular, discloses a form of accurate synchronization of multiple media output streams in an audio visual wireless playback arrangement.

BACKGROUND OF THE INVENTION

Wireless networks are becoming increasingly popular. It is often desirable to provide for accurate playback of multiple audio and visual channels in a networked environment. In particular, wireless speakers systems are also becoming increasingly popular, and often multiple audio playback streams are required. For example, Dolby 5.1 assumes a five loudspeaker arrangement surrounding a user. In the playback of multi-channel audio and visual information over a wireless loudspeaker arrangement, it is important to ensure synchronization of the multiple channels. Failure to accurately synchronize multi-channel audio playback will result in the production of unwanted artifacts.

Thus it is known that clocks of multimedia devices need to be synchronized, e.g., with the accuracy of a few microseconds. This is required by systems playing audio simultaneously from several locations.

One topology of a wireless media network includes a first device having a master clock, and one or more other devices having slave clocks. In such a topology, there is no interaction between slaves. Therefore, the master clock is used independently to synchronize each slave device clock. Therefore, in the description herein, only the synchronization of a single slave device to the master is described.

A clock, e.g., the master clock might be affected by a low-frequency phase drift, e.g., a so-called wander that might be due to changes in temperature in the crystal used for the master clock. One embodiment includes a phase locked loop in each slave device configured to follow the phase of the master's clock.

What is needed, e.g., to comply with the relative time error requirement of only a few microseconds of error, is a method and apparatus of measuring the time error or signal phase error with an accuracy of several microseconds. The NTP protocol (RFC 1305 and 2030) uses a method of measurement that includes applying a timestamp when an NTP packet is sent and recording the time of packet's arrival. The round-trip delay is measured by applying this timestamp inclusion and packet arrival time recording method in both directions, e.g., from a master to a slave device and back to the master device. The absolute time error value is estimated. The inventors and others have found that it is very difficult to achieve a good precision of time error measurement using an NTP-used method in a wireless network. A typical wireless network has a large and variable latency, not necessarily symmetric. Such a latency depends on the traffic intensity and behaves significantly worse than a switched wired Ethernet network.

The inventors have found that even quite sophisticated methods of assessing the quality of time error measurements and elimination of bad samples does not lead to an acceptable solution if the oscillators used in the system are not very stable.

One embodiment also uses an externally source derived clock, e.g., the clock from a CD player or a DVD player, e.g., a mass-production DVD player's crystal oscillator. Synchronization requires following changes in a master clock's frequency, e.g., caused by thermal drift, and the inventors have found that the drift can have time constants in the order of tens of seconds or minutes rather than hours. A slow PLL having a phase error transfer function with a low cut-off frequency is not a suitable solution.

One embodiment of the present invention provides a maximum time error value, e.g., an absolute time difference between the master clock and the slave clock of 20 microseconds.

A number of synchronized wireless media playback systems have been proposed.

U.S. Pat. No. 6,466,832 to Zuqert et al. entitled "High quality wireless audio speakers" disclose a first wireless loudspeaker arrangement using compressed audio with packet transmission. Multiple redundant packets are sent. The arrangement of Zuqert et al. does not disclose how to provide accurate time synchronization between output speakers.

U.S. Pat. No. 5,832,024 to Schotz et al entitled "Digital wireless loudspeaker system" also discloses a compressed wireless transmission system and uses phased locked looping to maintain time synchronization.

United States Patent Application Publication No. US 2004/0252400 discloses multiple media streams using a master node type arrangement.

Whilst wireless audio media distribution systems are well known, the accurate synchronization of output devices remains a problem.

SUMMARY OF THE INVENTION

One embodiment of the invention includes a method at a master device in an infrastructure network having an access point and client devices, each client device having a global clock and a local clock, the respective global clocks being synchronized. Each client device has a global clock and a local clock. The method includes reading a master local clock included in the master device to obtain a master local clock counter value. The method further includes reading a master global clock included in the master device to obtain a master global clock value corresponding to the read master local clock counter value. The method further includes sending data to at least one client device that provides to a receiving client device data sufficient to determine a relationship between the master local clock frequency and the corresponding master global clock frequency, such that each receiving client device that is a playback unit can use the received data, the local time according to the receiving playback unit's local clock, and the receiving playback unit's global clock value to adjust the slave device's local clock's frequency to synchronize to the master device's local clock's frequency, such that the adjusted local clock provides an adjusted local clock signal that is frequency synchronized to the master device's local clock. Each receiving playback unit device includes one or more elements operative to provide audio and/or visual playback.

In one embodiment, the access point is the master device. In another embodiment, the master device is a client device of the access point.

One embodiment of the invention includes a method comprising receiving one or more beacon or probe response frames from an access point master in an infrastructure network that includes the access point and one or more client devices. The method includes synchronizing a global clock of a slave device that is a client device of the access point to a global clock of a master device that in one embodiment is the access point, and in another embodiment is another client station. The method further includes receiving data transmitted by the master device, including data sufficient to determine the difference between a master local clock counter value obtained by reading a master local clock included in the master device, and a master global clock value corresponding to the read master local clock counter value, the master global clock value obtained by reading the global clock of the master device. The method further includes reading the value of a client local clock at the time of receipt of the received data, reading the value of the client global clock at the time of receipt of the received data; and adjusting the client device's local clock frequency to obtain an adjusted client local clock signal synchronized to the master local clock's frequency, such that the adjusted local clock signal is synchronized to the master device's master local clock, wherein the client devices each includes elements that provide audio and/or visual playback capabilities.

One embodiment of the method further includes determining a signal indicative of the phase error between the master local clock and the adjusted client local clock signal; digitally low pass filtering the signal indicative of the phase error to obtain a digital signal indicative of a filtered phase error; and generating the adjusted client local clock signal as the output of a signal-controlled oscillator with the signal indicative of the filtered phase error as input to implements a digital phased locked loop, such that the adjusted local clock signal is phase synchronized to the master local clock of the master device. In one embodiment, the digital phase locked loop is a Type 2, second order digital phase locked loop.

One embodiment of the invention includes a method of providing localized synchronization of a node of an infrastructure network to a set of nodes of the infrastructure network. The method includes: reading a current value for a global time function, the function being regularly transmitted over the infrastructure network; reading a local clock counter value of a clock provided internally to the network node; computing a current node local ratio given by the change in a local clock counter divided by a corresponding change in a global clock counter; receiving corresponding network local ratio values determinative of other nodes in the network; and adjusting the local clock speed depending on a comparison with the network local ratio values and the current node local ratio value. The node includes elements that provide audio and/or visual playback capabilities.

One embodiment of the invention includes a method of providing rate synchronization. The method includes a node of an infrastructure network using an internal local clock counter having a local clock speed and accessing a global transmitted time function. In one embodiment, the node includes a loudspeaker for audio playback. The method includes, at predetermined times, the node computing a local ratio given by the change in local clock counter divided by a corresponding change in global clock counter. The method further includes the node exchanging its local ratio with one or more other nodes; the node averaging the local ratios of the other nodes to produce an average local ratio; and the node adjusting its local clock speed depending on the comparison between its local ratio and the average local ratio.

One embodiment of the invention includes a method at a master device coupled to a digital audio source device that is operable to deliver audio data to the master device at a source device rate. The method includes sending beacon or probe response frames to enable at least one a client device that has a global clock and a local clock to synchronize its global clock; deriving a first rate relative to the rate of master local clock included in the master device, the first rate being the source device rate relative to the master device's master local clock rate; adjusting the master local clock rate depending on the relative differences in the first rate and the master local clock rate; reading the master local clock to obtain a master local clock counter value; reading a master global clock included in the master device to obtain a master global clock value corresponding to the read master local clock counter value; and sending data to at least one client device that provides to a receiving client device data sufficient to determine the difference between the master local clock reading and the corresponding master global clock reading, such that each receiving playback unit can use the received data, the time of receipt of the received data according to the receiving playback unit's local clock, and the receiving playback unit's local global clock reading at the time of receipt of the data to adjust the client device's local clock frequency to synchronize to the master's local clock's frequency, and hence to the source device rate, such that the adjusted local clock is synchronized to the source device rate. The client device includes a loudspeaker and is operable to playback audio through the loudspeaker.

One embodiment of the invention includes an apparatus comprising a master global clock and a transceiver coupled to the master global clock. In one embodiment, the apparatus is operable as an access point of an infrastructure network and further operable to send a beacon or a probe response frame, such that a client device that has a slave global clock can synchronize its slave global clock to the master global clock. In another embodiment the apparatus is a master client device of an access point. The apparatus includes a master local clock configured to provide a master local clock counter value when read; and logic coupled to the transceiver, master local clock, and master global clock configured to cause the master global clock to read when the master local clock is read to provide a corresponding master global clock value, the logic further configured to cause the transceiver to send data to at least one slave device, the data sufficient for a receiving slave device to determine the difference between the master local clock reading and the corresponding master global clock reading, such that each receiving playback unit can use the received data, the time of receipt of the received data according to the receiving playback unit's local clock, and the receiving playback unit's local global reading at the time of receipt of the data to adjust the slave device's local clock's frequency to synchronize to the masters local clock's frequency, such that the adjusted local clock is synchronized to the master's local clock. The receiving slave device includes a loudspeaker and is operable to playback audio through the loudspeaker.

One embodiment of the invention includes an apparatus comprising a global clock and a transceiver coupled to the global clock, operable to be a client device of an access point of an infrastructure network, further operable to receive one or more beacon or probe response frames from a master device of the network that in one embodiment is the access point, and in another embodiment is a client station of the access point. The apparatus is operable to synchronize the global clock to a master global clock of the master device. The apparatus further includes a local clock and logic coupled to the transceiver, the global clock, and the local clock operable to receive, via the transceiver, data transmitted by the master device, including data sufficient to determine the difference between a master local clock counter value obtained by reading a master local clock included in the master device, and a master global clock value corresponding to the read master local clock counter value, the master global clock value obtained by reading the global clock of the master device, the logic further operable to read the value of a client local clock at the time of receipt of the received data, read the value of the client global clock at the time of receipt of the received data; and adjust the client device's local clock frequency to obtain an adjusted client local clock signal synchronized to the master local clock, such that the adjusted local clock signal is synchronized to the master device's master local clock.

In one embodiment, the apparatus further includes an amplifier coupled to the transceiver and operative to amplify an audio signal for playback through a loudspeaker.

In one embodiment, the apparatus further includes a digital phase locked loop.

In one embodiment, the apparatus further includes video playback capabilities, such that the audio and video are played back synchronously across multiple devices in a network.

Particular embodiments may provide all, some, or none of these aspects, features, or advantages. Particular embodiments may provide one or more other aspects, features, or advantages, one or more of which may be readily apparent to a person skilled in the art from the drawings, descriptions, and claims herein.

BRIEF DESCRIPTION OF THE DRAWINGS

Embodiments of the present invention will now be described with reference to the accompanying drawings in which:

FIG. 9 shows a simple block diagram an alternate example infrastructure network for media stream playback that includes one or more embodiments of the present invention.

DESCRIPTION OF EXAMPLE EMBODIMENTS

One embodiment is designed to provide a wireless audio playback arrangement wherein the audio emissions from a set of playback transducers, e.g., loudspeakers, are accurately synchronized across a common time base.

Figure 1:
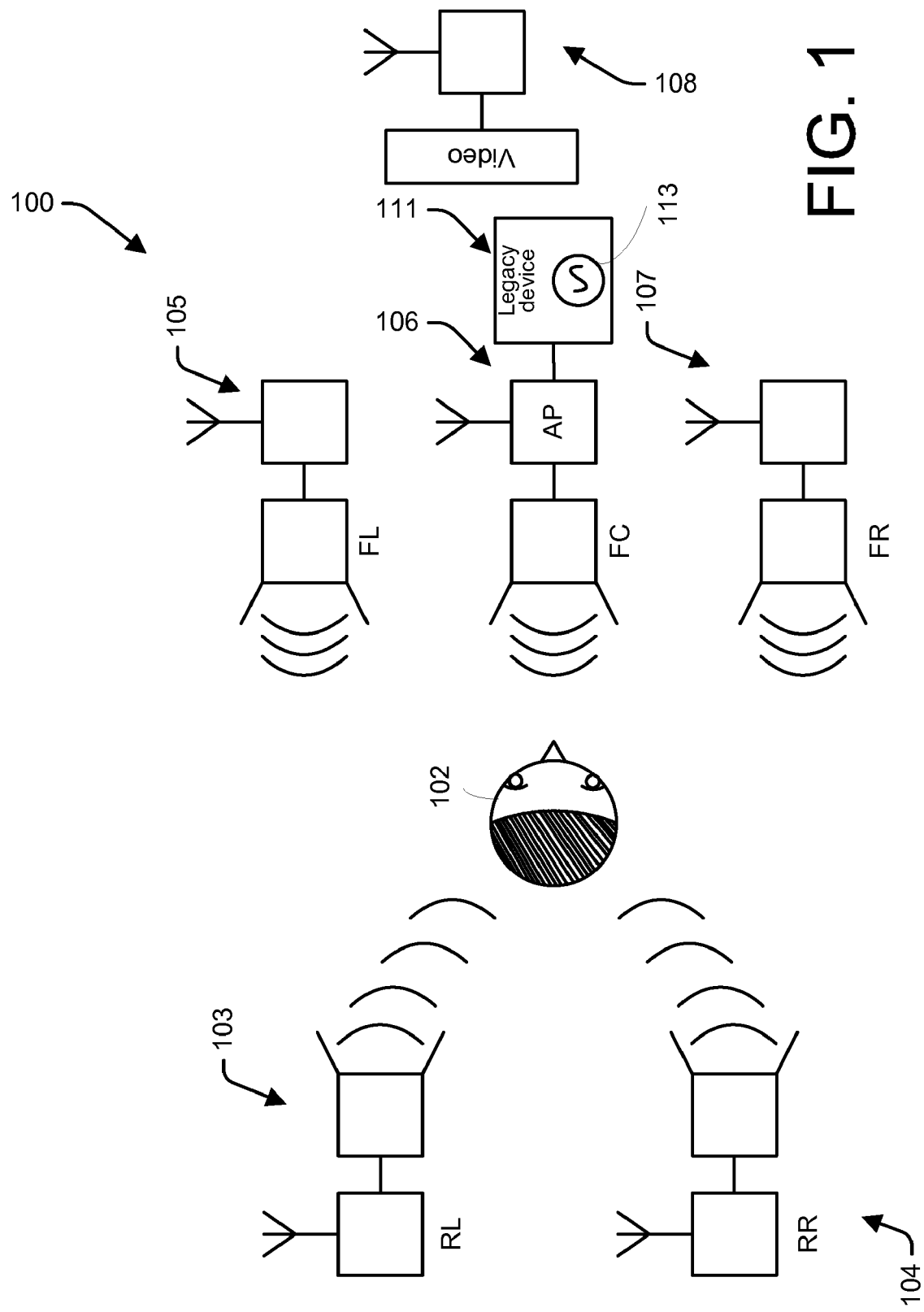
FIG. 1 shows a simple block diagram of an example infrastructure network for media stream playback that includes one or more embodiments of the present invention.

Turning initially to FIG. 1, there is illustrated schematically an infrastructure network for audio playback, e.g., a wireless network that includes embodiments of the present invention. A listener 102 is located in an audio playback environment having a set of wireless audio component playback units 103-107. Each playback unit includes a playback transducer, e.g., a loudspeaker, and is designed to play back one or more components (channels) of a multi-channel audio stream that, in one example, is a five channel audio stream. Of course other embodiments include fewer or more channels for playback. One such alternate embodiment includes a pair of component playback units for stereo playback. Another embodiment includes seven component playback units for 7.1 surround playback. Yet another embodiment includes a plurality of sets of one or more component playback units, each set for playback of the same audio, e.g., synchronously. This might be useful, for example, in a large space where there are several identical audio-visual presentations playing simultaneously.

In the example shown, in use, the component playback unit 103 plays back a rear left channel, the unit 104 plays back a right rear channel, the unit 105 plays back a front left channel, the component 106 plays back a front center channel and the component 107 plays back a front right channel. In the example illustrated, there also is a video signal, e.g., a video game simultaneously played back on a video output unit 108.

Each component playback system includes a wireless interface, e.g., conforming to the IEEE 802.11 standard. In one embodiment, the wireless network includes an access point. In the example shown in FIG. 1, one of the component playback units, e.g., center channel playback unit 106 is the access point. FIG. 9 shows an alternate arrangement that includes a separate access point 901, and all playback units 103-107, including the master device are client stations.

Figure 2:
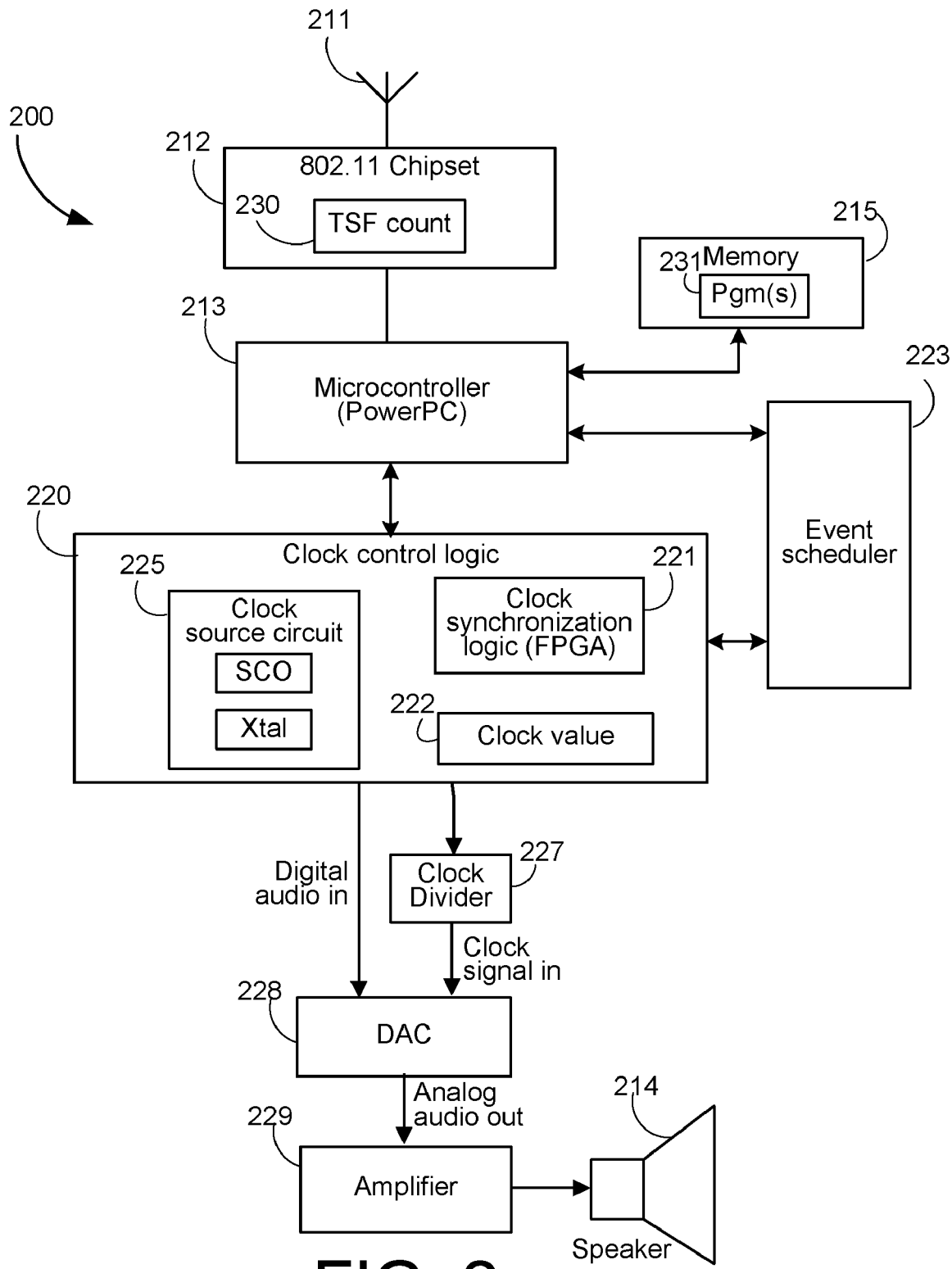
FIG. 2 shows a simple flowchart of a component playback unit that includes an embodiment of the invention.

Turning now to FIG. 2, there is illustrated an example component playback unit 200. The playback unit 200 includes a wireless interface that includes an antenna subsystem 211, which is connected to a wireless network transceiver unit 212 that implements a wireless station, e.g., one conforming to the IEEE 802.11 wireless network standard. In one embodiment, transceiver 212 includes a standard commercial IEEE 802.11 chipset from Atheros Communications, Inc. Several alternate standard IEEE 802.11 chipsets are available and can be used instead of the Atheros chipset. The wireless transceiver unit 212 is coupled to a microcontroller 213 that in one embodiment is a DSP device and that runs programs on the playback unit 200. In one embodiment, the microcontroller 213 is arranged to run programs under an operating system, e.g., a Linux operating system, and includes a PowerPC core. The operating system and other programs 231, including programs that implement one or more of the method embodiments of the invention, can be stored in a memory 215. Although such details are not shown in FIG. 2, in order not to obscure the inventive aspects, those in the art will understand that some of the signal wires of microcontroller 213, of memory 215, and of wireless transceiver 212 are coupled to each other via a bus subsystem.

The playback unit 200 is arranged to receive audio streams, such as compressed MPEG audio streams or uncompressed audio streams, which are then converted ("rendered") by the microcontroller 213 and other components to a form a set of digital samples for output. These can conform to the standard I2S format, or in any other form.

The digital audio samples are sent to a digital-to-analog converter (DAC) 228 for analog conversion before output via an audio amplifier 229 to at least one loudspeaker 214. A clock signal input is generated by clock control logic 220 and passed to the DAC 228 via a clock divider 227.

One embodiment of the clock control logic 220 includes clock synchronization logic 221 including at least a part implemented in one embodiment as an FPGA, and a clock generator 225 that includes a signal controlled oscillator (SCO) coupled to and controlling a crystal oscillator-based clock. In one embodiment, the clock control logic 220 is implemented partly in software, e.g., software in 231 in memory 215 executing on the microcontroller 213, and partly in the clock synchronization logic 221. The clock generator 225, in one embodiment provides clocking in the range of 80 MHz. In one embodiment, the clock rate of the clock generator 225 is adjustable using the SCO under control of the clock control logic 220, including in one embodiment, software executing in microcontroller 213. The clock control logic 220 includes a clock value to provide a local clock signal 222.

Operation of the clock control logic 220 to synchronize the local clock is described in more detail below.

According to one embodiment of the invention, one of the component playback units is a master device whose local clock signal 222 is the master, and the other component playback units are slave devices whose respective local clock signal 222 is to be synchronized to the master's clock. The clock signal 222, in the case that playback unit 200 is a slave device, provides slave clock value whose frequency and in one embodiment phase are synchronized to a master control clock's frequency and in one embodiment, phase. In one embodiment, the clock control logic 220 also implements, e.g., in combination with the microcontroller 213 and under control of a program 231 in memory 215, additional functionality including an event scheduler 223. The event scheduler 223 is shown as a separate block, and those in the art will understand that the block 223 is implemented by the clock control logic 220 in combination with the microcontroller 213.

One example environment shown in FIG. 9 includes a separate access point. In one such an embodiment, the master device is also a client device, and is selected randomly by a selection process. In another embodiment, the master device is pre-defined, e.g., to be the center front playback unit 106. In the case that one of the component units is also the access point, that access point also is the master device.

For the remainder of this description, the master device is assumed to be the front center audio unit 106. It also is assumed without loss of generality, that audio unit 106 not only acts as the master, but also as the access point of an infrastructure wireless network that includes audio units 103, 104, 105, and 107 as client devices. The master device 106 and each client device is assumed to have an architecture such as that of unit 200 shown in FIG. 2.

Turning again to FIG. 1, in one embodiment, the wireless network arrangement provides for communicating using a standard network protocol. In particular, TCP/IP based network protocol is used for communicating over the wireless network for distribution of the audio stream to each of units 103-107 and, in one embodiment that includes video, to video unit 108. In one embodiment, one of the audio units 103-107, or video unit 108, e.g., in one embodiment, the center front audio unit 106 acts as a wireless access point, while the other audio units 103, 104, 105, 107 and video unit 108 are wireless client devices of the access point unit, e.g., unit 106. In one embodiment, playback unit 106 also functions as a server sourcing the content, and distributes an audio content stream in a packet format to each of the client devices 103, 104, 105, 107. Each audio unit that is a client device is configured to render its appropriate audio stream.

In one embodiment, a legacy source device 111 of digital media data, such as a DVD player or a CD player is included. The legacy source device 111 includes a clock 113, and is connected to the master playback unit. As described herein, one aspect of the invention is causing playback via the component playback units 103-107 to be synchronized with the legacy source device's clock 113.

In one embodiment, synchronization is provided in a TCP/IP network in the following areas:

Rate synchronization: the rate at which each receiving client playback unit 103, 104, 105, 107 containing a loudspeaker and receiving streamed data converts digital audio samples into analog audio must be the same, within a tolerance, across all receiving client playback units 103, 104, 105, 107 containing a loudspeaker, in order to ensure there is no relative lead/lag between the receiving units containing a loudspeaker.

Event synchronization: ensuring that events such as start/stop/pause all occur at the same time, within a tolerance, across all audio and/or video playback units in the wireless network 100.

Legacy synchronization: What we call a legacy audio source device includes such digital audio source devices as CD players or DVD players to provide digital audio input for playback. FIG. 1 shows one legacy source device 111 connected to the component playback unit 106. A legacy audio source device such as source device 111 outputs digital audio over a digital connection. In one embodiment, the digital audio is in SPDIF format. In one embodiment, the master device, e.g., playback unit 106 that also acts as an access point accepts digital audio from the legacy audio source device 111 over a digital connection. That legacy audio source device includes a clock 113 that dictates the rate at which the digital audio samples are transferred. In the embodiment that outputs in the SPDIF format, the rate in the SPDIF format is dictated by the clock 113. The master component playback unit 106 that is also an access point, and the client slave component playback units 103, 104, 105, 107 must be able to ensure that the rate at which each receiving unit containing a loudspeaker converts digital audio samples into analog audio is the same as the rate dictated by clock 113 at which the data is being delivered by the legacy audio source device.

In one embodiment, accurate clocking is provided so as to provide a global time reference. For this, the time synchronization function ("TSF") provided in accordance with the 802.11 standard is used. TSF is implemented as part of the standard IEEE 802.11 chip sets such as the Atheros 802.11 chip set and is readable from a register within the chipset. In the component playback unit 200 of FIG. 2, the TSF count is shown as TSF count 230.

The TSF function as provided by the chip set provides a global network time value accurate to +/−2 microseconds. However, the TSF by itself cannot directly provide clocks suitable for use by audio-visual devices.

In one embodiment, the clock control logic 220, e.g., using the combination of the microcontroller 213 executing software and the synchronization logic 221 implements digital frequency adjustment logic to produce a clock signal, e.g., a clock value 222 that is frequency accurate. In one embodiment, the clock control logic 220, e.g., using the combination of the microcontroller 213 executing software and the synchronization logic also implements a digital phase locked loop within clock control logic 220 to generate a phase accurate clock signal, e.g., clock value 222. In one embodiment, the clock control logic 220 provides an internal fast local counter 222 as the clock signal. Both the frequency adjustment logic and the phase lock loop use the same clock generator 225 including an SCO and a crystal controlled clock.

In one embodiment, the clock control logic 220 is arranged to determine the rate at which local crystal oscillators are running in relation to the global clock reference for the wireless network, as provided by the IEEE 802.11 TSF.

For the remainder of this description, the master device is assumed to be the front center audio unit 106. Audio unit 106 not only acts as the master, but also as the access point of an infrastructure wireless network that includes audio units 103, 104, 105, and 107 as client devices. The master device 106 and each client device is assumed to have an architecture such as that of unit 200 shown in FIG. 2.

The access point and each client device, e.g., stations, e.g., audio units 103, 104, 105, and 107 in the IEEE 802.11 infrastructure network includes a MAC that provides a Time Synchronization Function (TSF), which includes a local TSF counter that is automatically incremented by the MAC module of the IEEE 802.11 node. In the embodiment shown in FIG. 2, the local TSF counter is shown in the IEEE 802.11 transceiver, e.g., the IEEE 802.11 chipset 212 as TSF count 230. The access point, e.g., audio unit 106 of FIG. 1 of the infrastructure network, or in the alternate arrangement shown in FIG. 9, unit 901 broadcasts beacon frames and sends probe response frames that cause synchronization of all the TSF counters in the client devices as a result of the stations receiving the beacon and probe response frames. Other wireless networks also include a similar function to synchronize clocks. The resolution of an IEEE 802.11 TSF counter is one microsecond and the values of the TSF counters at all the nodes belonging to the same access point should be the same or almost the same at any given time since all the TSF clocks tick synchronously. The IEEE 802.11 standard specifies a maximum relative error value of 4 µs, e.g., ±2 µs between TSF counters for a wireless network running in the infrastructure mode. The inventors have found experimentally that with typical commercial IEEE 802.11 transceiver chipsets, the precision of most of the readings of the TSF counter was about one microsecond. While the overall stability of an access point's crystal clock, e.g., clock generator 225 in the unit of FIG. 2, driving the beacon sending mechanism, and thus TSF counters of all client devices may not be very good in the long term, over a short time, the inventors have found TSF counters to offer a good relatively precise source device of timing information.

One embodiment of the present invention includes adjusting the signal into the signal control oscillator (SCO) of the clock generator 225 so that the reading of the local slave clock, e.g., clock value 222 of the clock control logic 220 of the audio unit 200 shown in FIG. 2 when used in one of slave units 103, 104, 105, or 107, based on knowing or determining the wireless network and processing delay of a master device's clock value denoted master_local_clock read by and received from the master device via the wireless network, such that the adjusted local slave clock frequency is synchronized with the master device's clock frequency.

Each IEEE client device 103, 104, 105, or 107, and the master device 106 provides the TSF function in the form of a TSF counter. Each device further includes a local clock, e.g., for devices that have the architecture 200 of FIG. 2, clock value 222.

Figure 3:
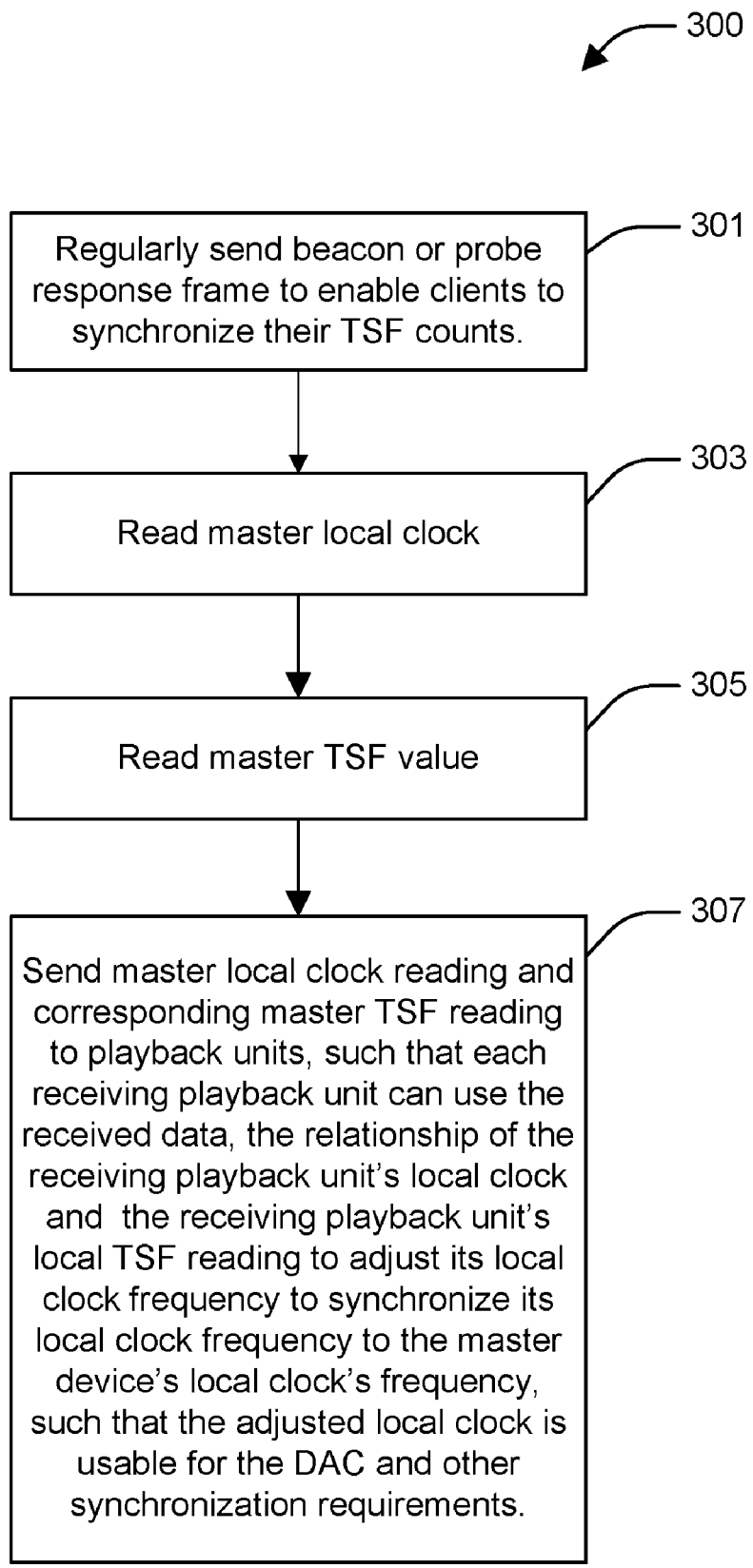
FIG. 3 is a flowchart of one method embodiment operating at a master playback unit that is also an access point.

FIG. 3 shows a flowchart of one method embodiment 300 operating in the master device such as device 200 that in one embodiment is in playback unit 106. In one embodiment, the master device is also the IEEE 802.11 access point.

In 301, the method includes the access point, e.g., master device 106 regularly, although not necessarily in a periodic fashion, sending beacon frames to enable client stations to synchronize their TSF counts. 301 also includes the master device 106 optionally sending one or more probe response frames in response to receiving a corresponding probe request frame.

In the alternate arrangement of a separate access point, 301 is replaced by the

In the alternate arrangement of a separate access point, 301 is replaced by the master device 106 being a client device of the access point and receiving one or more beacon frames or probe response frames from the access point to synchronize its TSF count.

In 303, the method 300 reads the master's local clock counter value, e.g., from the clock value 222 of the clock control unit 220 and denoted master_local_clock herein. In 305, when the value master_local_clock is obtained, the master device 106 reads the master's TSF value at the master device's IEEE 802.11 transceiver 212 to independently mark the time at which the master local clock is read. Denote this TSF value as TSF_master_reading.

Thus, when the master_local_clock is read in 303, the master device's TSF is read in 305, so that a pair of (master_local_clock, TSF_master_reading) values is generated. In 307, the master transmits this data over the wireless network 100, such that each receiving playback unit can use the received data, the relationship of the receiving playback unit's local clock and the receiving playback unit's local TSF reading to adjust its local clock frequency to synchronize its local clock frequency to the master device's local clock's frequency, such that the adjusted local clock is usable for the DAC and other synchronization requirements.

In one embodiment, the master device broadcasts or multicasts to all the slave devices a new type of broadcast or multicast packet, e.g., a UDP packet that includes the timing information. In another embodiment, an unicast packet is sent individually to all the slave devices over separate unicast-based channels, such that slave devices can receive the pairs (master_local_clock, TSF_master_reading). In either case, in one embodiment, the information is broadcast, multicast, or unicast regularly. In one embodiment, this is every 100 ms. In one embodiment, the data is sent at the same rate as beacon frames are broadcast by the master device functioning as the access point. In one embodiment, the information is sent as a new information element (IE), called a time synchronization IE, in each beacon frame broadcast from master device 106 functioning as the access point, and in each probe response sent by the master device 106. Thus, according to that embodiment, the sending of 303 is at the same time as the broadcasting of a beacon frame in 301.

In one embodiment, the nominal frequency (in MHz) of the master device's local clock, denoted $f_{clock}$, is measured at the master device and also sent from time to time, in the broadcast or multicast that contained the (master_local_clock, TSF_master_reading) pair.

Figure 4:
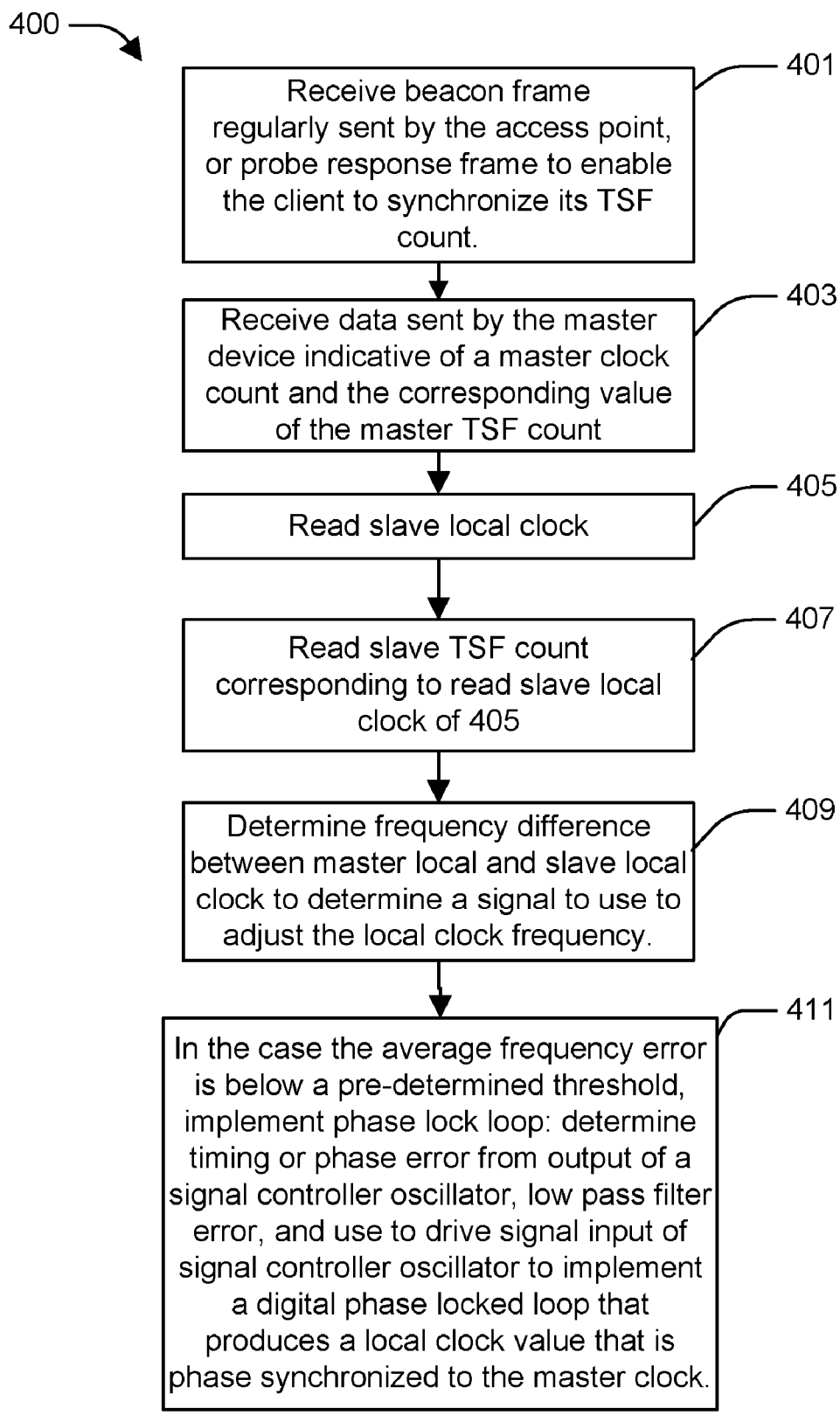
FIG. 4 is a flowchart of one method embodiment operating at a slave playback unit.

FIG. 4 shows a simplified flowchart of a method embodiment 400 operating at a client device, e.g., client device 103 acting as a slave device. The method is implemented, e.g., as software in the memory of the client device, e.g., memory 215 in the case the client device 106 follows the architecture 200 of FIG. 2. In one embodiment, some of the method of 400 is implemented by the clock control logic 220 as a combination of software executing in the microcontroller and logic in the clock synchronization logic 221.

In 401 the slave device receives one or more beacon frames or probe response frames sent by the access point, e.g., master device 106 in the arrangement of FIG. 1, or the access point 901 in the example arrangement of FIG. 9, and synchronizes its local TSF, e.g., local TSF count 230 in the case the client has the architecture shown in FIG. 2.

In 403 the slave device 103 receives data sent by the master device 106 indicative of a master clock count and the corresponding value of the master TSF counter. In one embodiment, in 403, the slave device receives a pair of values (master_local_clock, TSF_master_reading) from the master device. In one embodiment, these are in a new type of broadcast or multicast packet, e.g., a UDP packet. In another embodiment, these are in a unicast or multicast packet. In yet another embodiment, the pair of values are in a time synchronization IE in a beacon frame from the master device 106 such that the receiving of 303 is the same as the receiving of 301.

In one embodiment, $f_{clock}$ the nominal frequency of the master device's local clock, is also received from time to time from the master device.

As described above, the client device includes a local clock, e.g., for a playback unit architecture such as that of FIG. 2, the local clock 222, that is used, for example, for timing the conversion by the digital-to-analog converter 228. In one embodiment, at some time after reception of the master device's timing data, in 405, the slave device reads its local clock counter value. In another embodiment, the reading is as close as possible to the time of reception. Denote this clock as slave_local_clock. In one embodiment, the slave device 103 in 407 also reads its TSF counter, denoted TSF_slave_reading at the same time.

In order to achieve sufficient accuracy, the inventors have found that is advantageous that the operation of reading the slave device's local clock and the slave device's TSF counter be uninterruptible, e.g., with interrupts disabled so that the two readings are assured to be close together in time.

Using the received timing data from the master device, and the observed values of slave_local_clock and TSF_slave_reading, the slave device is able to calculate the frequency difference between its local clock counter frequency and the master device's local clock counter frequency. The slave device can thus adjust its local clock frequency accordingly so that the frequency is synchronized to the master's local clock frequency.

In particular, in 409, the client device determines a value indicative of the frequency difference between master local and slave local clock to determine a signal to use to adjust the local clock frequency.

In one embodiment, 409 includes determining an estimated counter value of the master local clock at the time when the slave device reads its local clock counter, denoted by Estimated_master_local_clock. In one embodiment this is obtained by interpolation according to the operations illustrated in FIG. 5 and described by:

Estimated_master_local_clock=master_local_clock+
(TSF_slave_reading−TSF_master_reading)*$f_{clock}$ Where $f_{clock}$ denotes the nominal frequency (in MHz) of the master device's local clock.

Given these calculated values, the slave device makes appropriate adjustments to modify its local clock's frequency. In one embodiment, the method uses two different techniques to achieve this, and thus the frequency correction operates in two modes: a first mode including using frequency adjustment logic and a second mode that includes using a phase locked loop. Initially, the method is in the first mode. When a quantity indicative of the average measured frequency error between the slave local clock and the master local clock is sufficiently small, the method switches to the second mode using the phase locked loop.

Both modes use the signal-controlled oscillator of the clock generator 225 to adjust the clock frequency of the clock in the clock generator 225. One embodiment includes a signal-controlled oscillator that has an adjustment range of ±100 parts per million of nominal frequency of the crystal, divided into 65535 discrete input control steps. In a particular, one embodiment includes an SCO with 16-bit input converted into a pulse width modulated signal used to drive the crystal clock of the clock generator 225.

In the first mode, because the difference between the frequency of the master local clock and the frequency of the slave local clock may be relatively large, correspondingly large corrections to the local clock's frequency may be needed. The first mode using frequency adjustment logic can provide relatively large corrections to the local clock's frequency, after which, when an average of the difference between the master local clock's frequency and the slave local clock's frequency is sufficiently small, the system switches operating modes to the second mode using a phase locked loop.

The first mode is now described in more detail. In one embodiment, from time to time, but not necessarily periodically, after a slave device in 403 receives a packet transmitted by the master device containing master clock information as described above, the slave device in 409 calculates the ratio between the master global clock counter and master local clock counter, representing the relative frequency of the master device's local clock with respect to the global time. In 405 and 407, the slave device reads its local clock counter and local global time counter in order to calculate a local ratio of global clock frequency to local clock's frequency. The two clock ratios are compared in 409, resulting in a calculated difference between the two ratios, and in effect, the difference between the slave local clock's frequency and the master local clock's frequency.

The clock control logic 220 uses the calculated difference between the slave local clock's frequency and the master local clock's frequency, to form the signal into the SCO of the clock generator 225 to adjust the local clock's frequency such that the local clock's frequency becomes synchronized over time with the master local clock's frequency. In one embodiment, in the first mode, the control signal input to the signal controlled oscillator determined by the clock control logic 220 that in the first mode implements frequency adjustment logic is a function of the average frequency error.

One embodiment attempts to force the clock frequency according to an absolute calculated frequency error.

In one alternate embodiment, rather than attempting to force the clock according to an absolute calculated frequency error, the clock control logic 220 in the first mode implementing frequency adjustment logic makes relatively small correction steps. Several such steps may be necessary. While this has the effect of taking a longer time to achieve synchronization than if larger steps are used, such an embodiment allows erroneous readings to be filtered out, and avoids frequency adjustment overshoots. Thus, one embodiment includes filtering out erroneous measurements. One embodiment includes from time to take taking adjustment steps that are the smallest possible adjustment provided by the clock control circuit.

In one embodiment, while in the first mode, the clock control circuit calculates the clock error and scales the calculated clock error by a large fraction of the clock control circuit's range, which is then progressively reduced. In one embodiment, an initial maximum step of 2000 of the range of 65535 steps is used, and in successive iterations, the maximum step is reduced by a pre-defined scaling factor. To allow larger steps for larger error values, errors greater than certain threshold levels are treated differently. This allows large errors to be corrected by large steps because they are more likely to represent real frequency errors, whereas in normal operation, smaller errors which are often due more to measurement error rather than any actual frequency difference are filtered out.

In one embodiment, the initial adjustment process of the frequency adjustment logic is implemented as a binary search such that initially, a large correction step is taken, and then on successive iterations, frequency correction steps of half the magnitude of the previous step are taken in order to minimize the measured frequency error, down to a lower minimum step size.

One embodiment of this frequency adjustment logic and the method it implements further include calculating a moving average of the last few time data samples, e.g., the last N data samples, where N is a small integer. One embodiment also includes calculating a weighted moving average of the last N samples. One embodiment also includes determining a trimmed mean.

In one embodiment, the TSF counter on both master and slave devices' is updated every microsecond. Recall that an estimated counter value of the master local clock at the time when the slave device reads its local clock counter, denoted by Estimated_master_local_clock, is in on embodiment is obtained by interpolation according to the operations illustrated in FIG. 5 and described by:

Estimated_master_local_clock=master_local_clock+
(TSF_slave_reading−TSF_master_reading)*$f_{clock}$ where $f_{clock}$ denotes the nominal frequency (in MHz) of the master device's local clock. In one embodiment, $f_{clock}$ is measured on the master device, and transferred to the slave devices within the synchronization data packet.

In the second mode, in the case the average frequency error is below a pre-determined threshold, the method includes in 411 implementing a phase lock loop. The phase lock loop includes using the Estimated_master_local_clock determined as described above to determine timing or phase error from the clock generated by the clock generator 225 as the output of a signal controller oscillator. An error is generated, the error is low-passed filtered to form a low pass filter error, and the low pass filter error is used to form a drive signal for the signal controller oscillator of the clock generator 225. Thus, in the second mode, the clock control logic 220 implements a digital phase locked loop that produces a local clock signal that is phase synchronized to the master clock.

Figure 5:
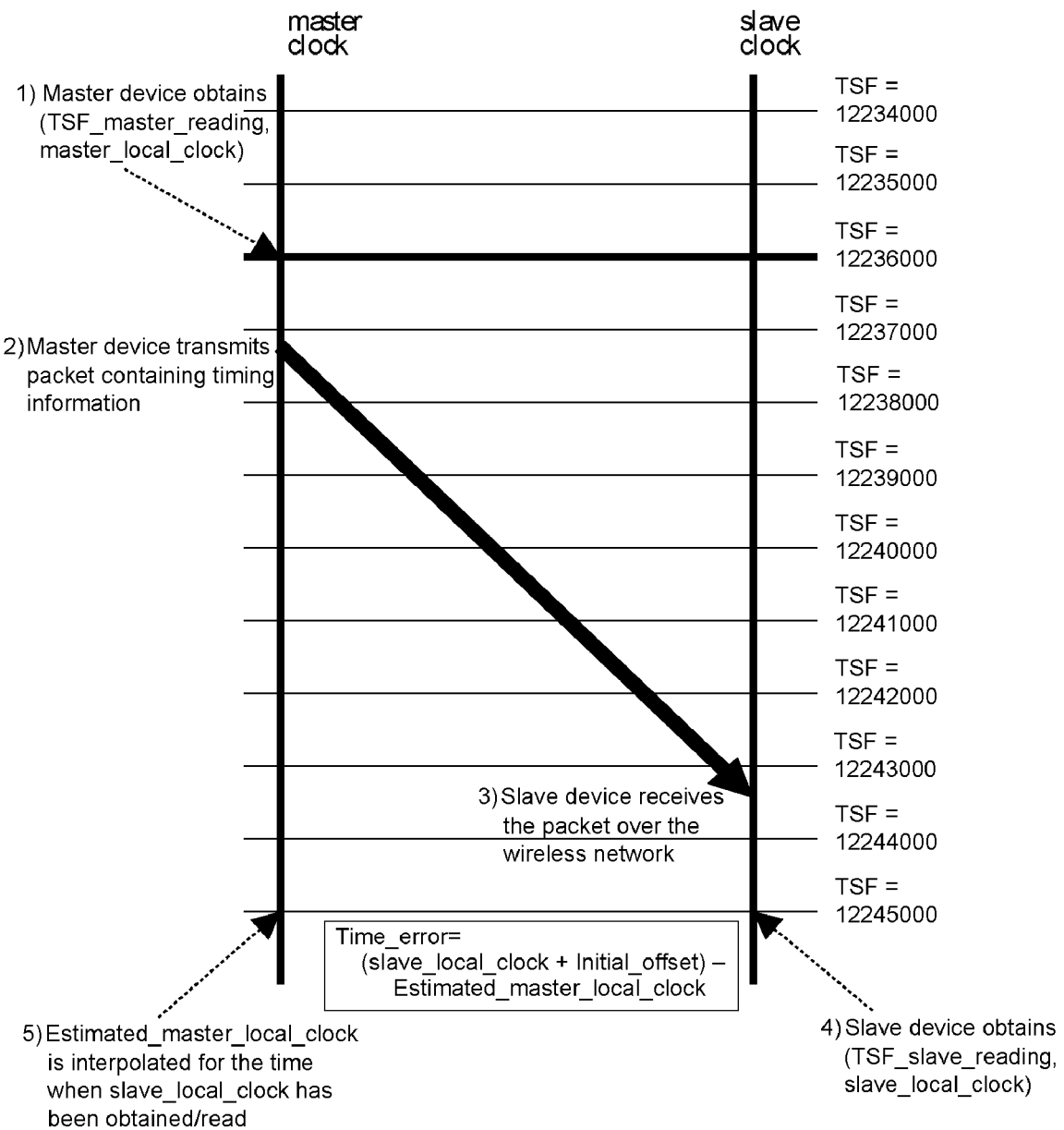
FIG. 5 illustrates aspects of how one method of synchronization between a slave playback unit and one or more slave playback units operates.

As shown in FIG. 5, the time error value denoted Time_error, assumed to be a relatively small value, is:

Time_error=(slave_local_clock+Initial_offset)−Estimated_master_local_clock where Initial_offset is the difference between the master local clock counter and the slave local clock counter calculated at the start of the synchronization process.

The phase error denote Phase_error and scaled in radians is:

Phase_error=2*π*Time_error.

The phase error is used in the phase locked loop of the second mode. The phase locked loop is arranged to cause the phase of the slave device's local clock, e.g., the device's clock value 222 for an architecture such as FIG. 2, to follow the phase of the master device's local clock master_local_clock.

Figure 6:
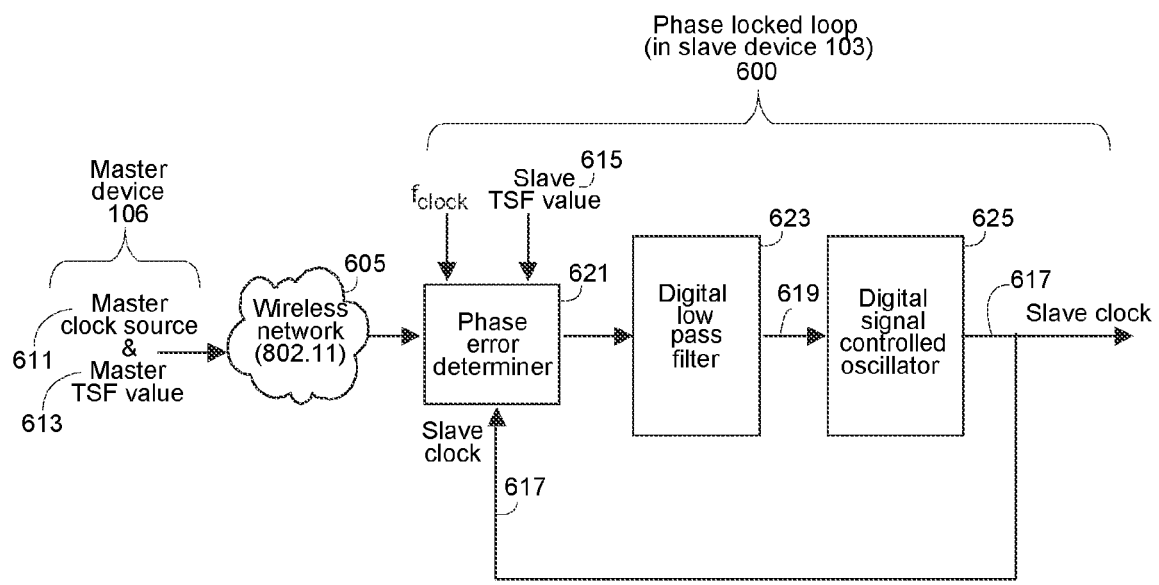
FIG. 6 shows a simple functional block diagram of an embodiment of a digital phase locked loop according to one or more aspects of the present invention.

FIG. 6 shows a simple functional block diagram of an embodiment of a digital phase locked loop 600 implemented in the slave device, e.g., slave device 103. An error determiner, e.g., a phase error determiner 621 determines the phase error between the slave local clock and the adjusted master local clock using input from received packets, the packets received via a wireless network 605 and including timing information from the master device related to the master clock reading 611 and the master device's TSF value 613 at the time the master clock is read. In one embodiment, the phase error determiner 621 receives a master clock reading and a master TSF reading in one or more received packets sent from the master device over the wireless network, and also uses the slave device's TSF value 615. In one embodiment, a signal indicative of the phase error is determined as described above from the time error.

The signal indicative of the phase error is low pass filtered by a low pass filter 623, e.g., a digital low pass filter to obtain a digital signal 619 indicative of a filtered phase error. The signal indicative of the filtered phase error is used as the control signal to drive a digital signal-controlled oscillator 625 to generate the local clock signal 617 as the output of the signal-controlled oscillator.

In one embodiment, the digital phase locked loop is a Type 2, second order digital phase locked loop.

Thus, returning to the flowchart of method 400, one embodiment includes in 411, determining the time error or phase error from the output of a signal-controlled oscillator having a signal input terminal, low-pass filtering the phase or timing filter error, and using it to drive signal input terminal of the signal-controlled oscillator to implement a digital phase locked loop that produces an adjusted local clock signal that is phase synchronized to the master local clock.

Returning to FIG. 6, denote by G(s) the analog version of the phase transfer function of the low pass filter 623 and the signal controller oscillator 625 combined. In the embodiment shown in FIG. 6, there is no frequency divider in the loop, so that the open loop response is G(s).

By a Type 2 second order phase locked loop is meant a phase locked loop that has an open loop response with a transfer function of the form:

$$G(s) = \frac{K(s+a)}{s^2}$$

By Type 2 is meant that the open loop response contains a double pole at 0 and a negative real zero. The open loop transfer function G(s) includes the response (gain) of the phase determiner 621, denoted as gain $K_p$, the transfer function of the low pass filter denoted $K_f(s)$ and the transfer function of the signal controller oscillator 625. Now, since the transfer function of the signal-controlled oscillator has the format of $K_v/s$, where $K_v$ denotes a constant, $K_f(s)$ is:

$$K_f(s) = \frac{A\left(s + \frac{1}{T}\right)}{s}$$

where A is the gain of the filter and T is the time constant of the low pass filter.

The closed loop transfer function for the phase may hence be written as:

$$K(s) = \frac{(2\zeta\omega_n s + \omega_n^2)}{s^2 + 2\zeta\omega_n s + \omega_n^2}$$

where $\zeta$ is a damping factor is equal to:

$$\zeta = \frac{1}{2}\sqrt{KT}$$

and $\omega_n$ is the natural pulsatation given by:

$$\omega_n = \sqrt{\frac{K}{T}}$$

and the gain K is:

$$K = K_p K_v A$$

The inventors have found that for good performance, the damping factor must not be too small, e.g., $\zeta > 0.7$. In one embodiment a value $\zeta = 1.00$ is used. T in one embodiment is chosen to be 100s, and K is 0.04. In this case, $\omega_n = 0.02$ rad/s, equivalent to 3.18 MHz.

Figure 7:
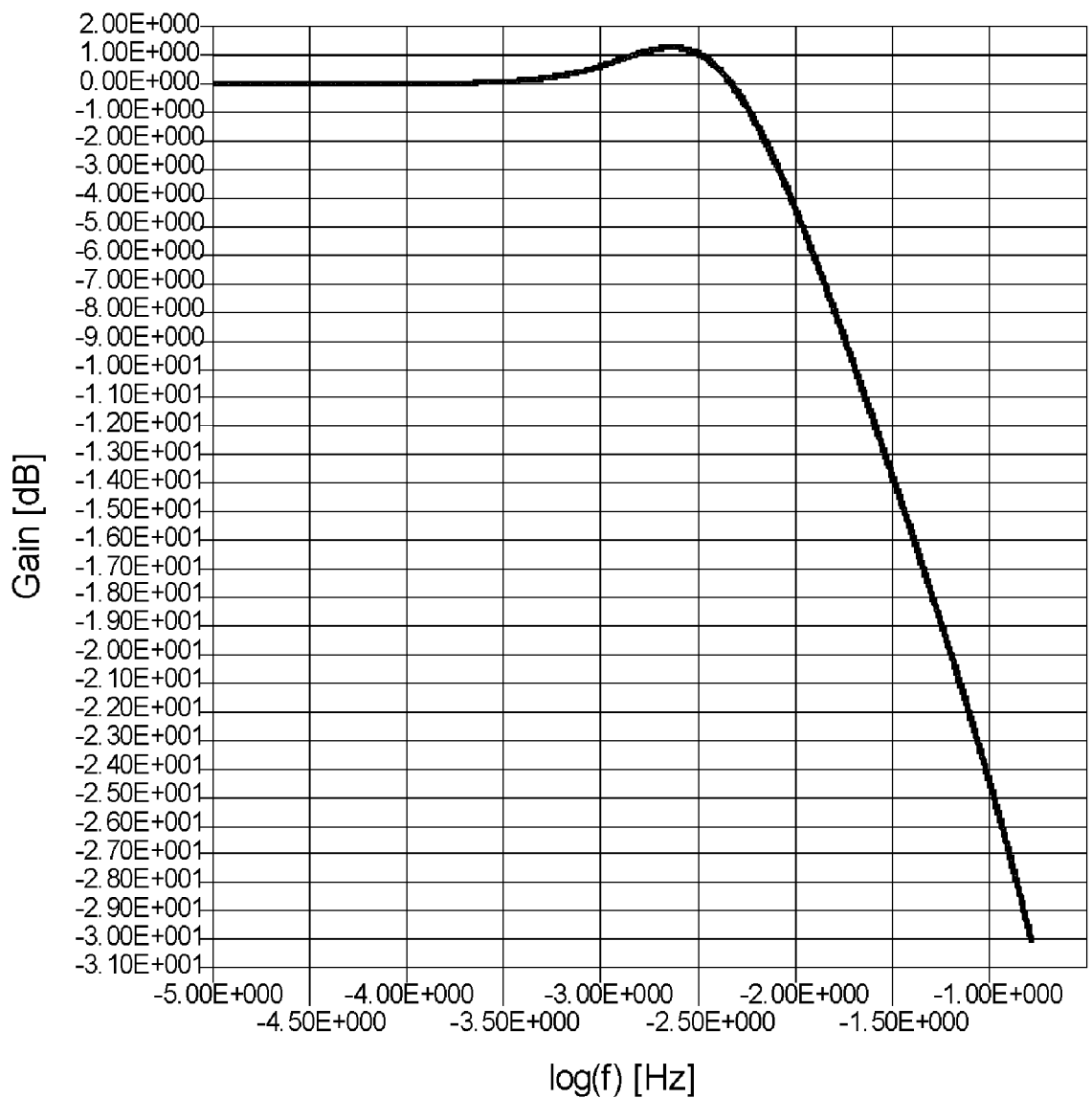
FIG. 7 shows a simulation of the gain of an embodiment of the digital phase locked loop of FIG. 6 as a function of jitter's frequency in the "j-omega" domain.

FIG. 7 shows a simulation of the digital PLL 600's gain as a function of jitter's frequency in the "j-omega" domain. The simulation has included a low pass analog filter implemented at the output of the D/A converter with a double pole at 0.5 radians/s.

In one embodiment, the low pass filter is implemented as an infinite impulse response digital filter in the software in the memory.

Given that the local clocks have been synchronized using the above described methods, one embodiment of the invention includes ensuring that media events such as start/stop/pause are coordinated across the network and occur at the same time, within a tolerance, across all audio and/or video playback units in the wireless network.

When an event is required to be coordinated with all other devices in the network, the master device must send a network message containing a value of the global time counter that represents a time a certain length of time into the future. Upon reception of this message at a slave device, the slave device needs to calculate the equivalent value of its local clock counter value corresponding to the global clock counter of the message. This is performed with reference to the calculated relationship between the slave local clock's frequency and the slave global clock frequency.

One embodiment of the invention includes legacy synchronization. Referring again to FIG. 1, in one embodiment, the master device, e.g., playback unit 106 that also acts as an access point and accepts digital audio from a source device, e.g., a legacy audio source device 111 over a digital connection. That legacy audio source device 111 includes a clock 113 that dictates the sampling rate for the digital audio samples out of the source device. In one embodiment, the digital output of the digital audio source device is in SPDIF format, and the clocking rate of the legacy source device is derived from the SPDIF format signal. The master component playback unit 106 that is also an access point, and the client slave component playback units 103, 104, 105, 107 must be able to ensure that the rate at which each receiving unit containing a loudspeaker converts digital audio samples into analog audio is the same as the rate of the data delivered by the legacy audio source device, e.g., the rate delivered from the SPDIF format.

Figure 8:
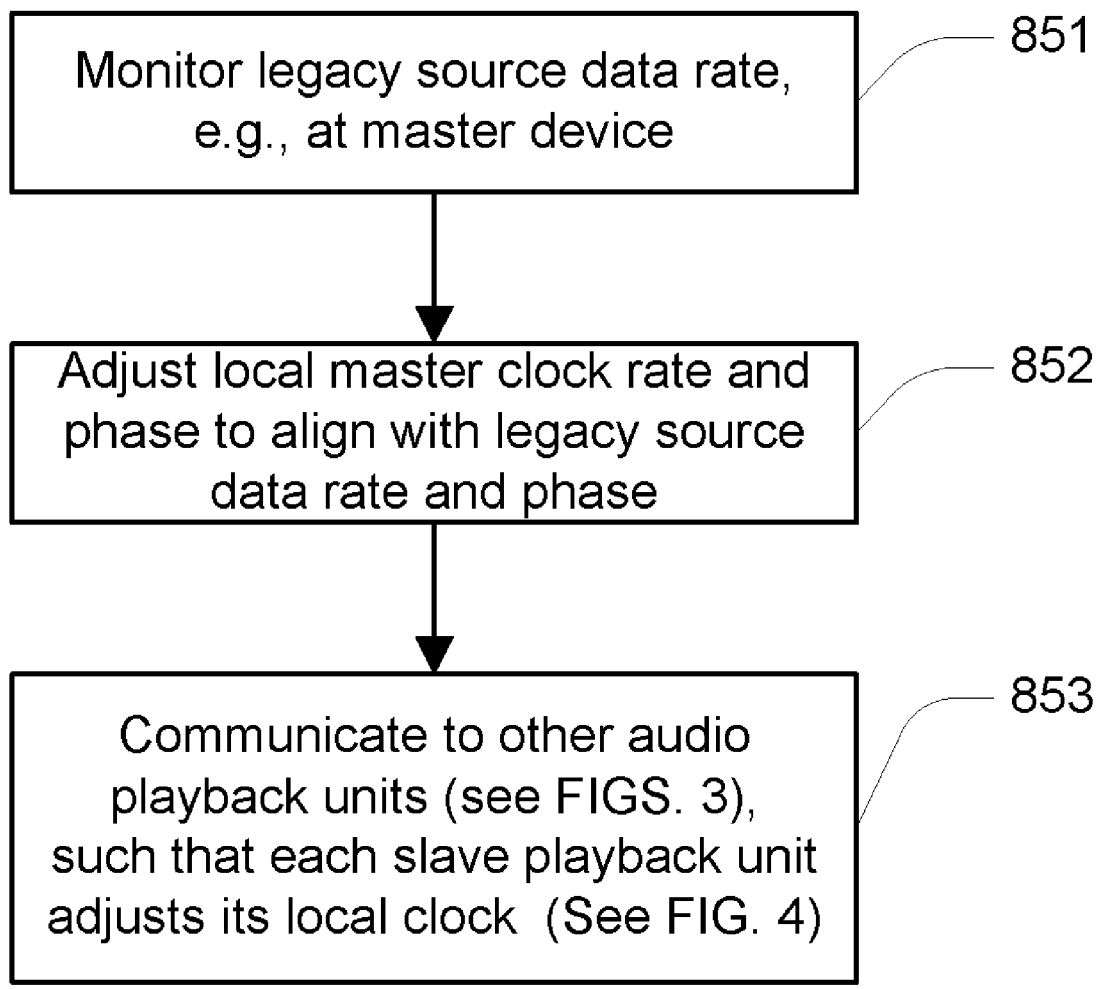
FIG. 8 shows a flowchart of an embodiment of legacy synchronization carried out at the master device that includes one or more aspects of the present invention.

FIG. 8 illustrates one process of legacy synchronization carried out at the master device, e.g., playback unit 106. The master device accepts as input data from the legacy device 111, and monitors in 851 the rate of the data delivered from the legacy device 111, e.g., the rate dictated for a signal from clock 113, e.g., the rate derived from the data in the case the source device provides data in SPDIF format. In 852 the master device adjusts its local master clock's rate (and phase) to align with that of the legacy source device clock 113.

Now that the rate (and phase) of the master's clock are aligned with that of the legacy source device, in one embodiment, the master device communicates its rate to slave devices in order for the slave device to maintain the same rate as the clock. In one embodiment, in 853, the master device follows the process shown in the flowchart of FIG. 3 and described above to cause the local clocks of each component playback unit to synchronize with the master local clock, and hence the legacy device's clock. Each component playback unit follows the process shown in the flowchart of FIG. 4 and described above to synchronize the local clock of each audio playback device to the master device's local clock, and hence with the legacy device's clock.

One legacy synchronization method includes deriving a first rate relative to the rate of an internal clock in a first node of a wireless network. In this embodiment, the first node is coupled to a digital audio source device delivering data at a source device rate. The method includes the first node adjusting its local clock counter rate depending on the relative differences in the first data rate and the internal clock counter rate. The method further includes the first node calculating a first local ratio given by the change in a local clock counter relative to a change in a global time reference; and the first node communicating the first local ratio to the other nodes, such that each node receiving the communication from the first node can adjust its local clock counter speed to reduce discrepancies between the that of the first node's local clock. In one embodiment, the first and other nodes of the wireless network node are component playback units as described in FIG. 2. In one version, the first data rate is derived from incoming an SPDIF format signal from the digital audio source device 111.

Thus embodiments have been described for providing synchronization in a network of component playback devices, such as such as shown in FIG. 1.

In keeping with common industry terminology, the terms "base station", "access point", and "AP" may be used interchangeably herein to describe an electronic device that may communicate wirelessly (or more broadly though a medium such as power lines; see below) and substantially simultaneously with multiple other electronic devices, while the terms "client," "slave device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment for operation conforming to the IEEE 802.11 standard has been described, the invention may be embodied using devices conforming to other wireless network standards and for other applications, including, for example other WLAN standards and other wireless standards. Applications that can be accommodated include IEEE 802.11 wireless LANs and links, wireless Ethernet, HIPER- LAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

Embodiments of the invention may also be for operation in networks that are not strictly wireless, but operate similarly. Included in such networks are power line networks that use radio frequencies, e.g., radio frequency bursts, OFDM bursts, and so forth. One example is ×10. Thus the term wireless is to be interpreted broadly herein to include wired communication that using radio frequency signals.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes a source device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a component playback unit. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method at a master device in an infrastructure network having an access point and client devices, each client device having a global clock and a local clock, the respective global clocks being synchronized; the method comprising:
   reading a master local clock included in the master device to obtain a master local clock counter value;
   reading a master global clock included in the master device to obtain a master global clock value corresponding to the read master local clock counter value; and
   sending to at least one slave device data sufficient to determine a relationship between the master local clock frequency and the corresponding master global clock frequency, each slave device being a client device, such that each receiving client device that is a playback unit can use the received data, the local time according to the receiving playback unit's local clock, and the receiving playback unit's global clock value to adjust the slave device's local clock's frequency to synchronize to the master device's local clock's frequency, such that the adjusted local clock provides an adjusted local clock signal that is frequency synchronized to the master device's local clock,
   wherein the receiving playback unit includes a digital to analog converter that is clocked by a signal derived from the adjusted local clock signal and that is operative to generate analog audio data, and one or more elements operative to provide audio playback.

2. A method as recited in claim 1, wherein the adjusting of the slave device's local clock's frequency is by applying a control signal to a signal controlled oscillator.

3. A method as recited in claim 1, wherein the adjusting of the slave device's local clock's frequency is by applying a control signal to a signal controlled oscillator to change the frequency, the control signal indicative of the frequency difference between the master local clock and the adjusted client local clock, until an average of the frequency difference between the master local clock and the adjusted client local clock is below a pre-defined threshold, thereafter operating a digital phase locked loop to synchronize the phase of the adjusted local clock signal to the master device's local clock.

4. A method as recited in claim 1, wherein the access point is the master device.

5. A method as recited in claim 1, wherein the master device is a client device of the access point.

6. A method as recited in claim 1, wherein the sending of the data is periodically.

7. A method as recited in claim 1, wherein the sending of the data is non-periodically.

8. A method comprising:
   receiving one or more beacon or probe response frames from an access point of an infrastructure network, and synchronizing a global clock of a client device of the access point to a global clock of the access point;
   receiving data transmitted by a master device having a global clock matching the global clock of the access point, the received data including data sufficient to determine the relationship between the frequency of a master local clock counter value obtained by reading a master local clock included in the master device, and the frequency of a master global clock value corresponding to the read master local clock counter value, the master global clock value obtained by reading the global clock of the master device;
   reading the value of a client local clock and reading the value of the client global clock from time to time; and
   adjusting the client device's local clock's frequency to obtain an adjusted client local clock signal synchronized to the master local clock's frequency, such that the adjusted local clock signal is synchronized to the master device's master local clock,
   wherein each client device includes a respective digital to analog converter that is clocked by a signal derived from the respective adjusted client local clock signal and that is operative to generate analog audio data, and one or more elements operative to provide audio playback.

9. A method as recited in claim 8, wherein the data is transmitted periodically by the master device.

10. A method as recited in claim 8, wherein the data is transmitted non-periodically by the master device.

11. A method as recited in claim 1, wherein the adjusting of the client device's local clock's frequency is by applying a control signal indicative of the frequency difference between the master local clock and the adjusted client local clock to a signal controlled oscillator.

12. A method as recited in claim 11, wherein the adjusting of the slave device's local clock's frequency by applying a control signal to the signal controlled oscillator is until an average of the frequency difference between the master local clock and the adjusted client local clock is below a pre-defined threshold, thereafter the method comprising operating a digital phase locked loop to synchronize the phase of the adjusted local clock signal to the master device's local clock.

13. A method as recited in claim 8, further comprising:
   determining a signal indicative of the phase error between the master local clock and the adjusted client local clock signal;
   digitally low pass filtering the signal indicative of the phase error to obtain a digital signal indicative of a filtered phase error; and
   generating the adjusted client local clock signal as the output of a signal-controlled oscillator with the signal indicative of the filtered phase error as input to implement a digital phased locked loop, such that the adjusted local clock signal is phase synchronized to the master local clock of the master device.

14. A method as recited in claim 13, wherein the digital phase locked loop is a Type 2, second order digital phase locked loop.

15. A method as recited in claim 13, wherein the digital phase locked loop is operative only when an average of frequency difference between the master local clock and the adjusted client local clock is below a pre-defined threshold.

16. A method as recited in claim 8, wherein the access point is the master device.

17. A method as recited in claim 8, wherein the master device is a client station of the access point.

18. A method of providing localized synchronization of a node of an infrastructure network to a another node of the infrastructure network, the method comprising the steps of:
   reading a current value for a global time function, the function being regularly transmitted over the infrastructure network;
   reading a local clock counter value of a clock provided internally to the network node;
   computing a current node local ratio given by the change in a local clock counter divided by a corresponding change in a global clock counter;
   receiving corresponding network local ratio values determinative of the another node in the network; and adjusting the local clock speed depending on a comparison with the network local ratio values and the current node local ratio value,
wherein the node includes a loudspeaker and is operative to playback audio through the loudspeaker.

19. A method as claimed in claim 18, wherein the adjusting step further includes adjusting the local clock speed of the infrastructure network node so as to reduce the difference between an average network local ratio value and the current node local ratio value.

20. A method of providing rate synchronization, the method comprising:
a node of an infrastructure network using an internal local clock counter having a local clock speed and accessing a global transmitted time function, the node including a loudspeaker for audio playback;
at predetermined times, the node computing a local ratio given by the change in local clock counter divided by a corresponding change in global clock counter;
the node exchanging its local ratio with one or more other nodes;
the node comparing its local ratio with the local ratio of another node in the infrastructure network; and
the node adjusting its local clock speed depending on the comparison between its local ratio and the local ratio of the another node.

21. A method as claimed in claim 20 wherein the adjusting step includes incrementally adjusting the local clock speed so as to reduce a difference between the local ratio of the node and the local ratio of the another node.

22. A method as claimed in claim 20 wherein the adjusting step includes dispensing with and adjustment of the local clock speed when the difference is below a predetermined limit.

23. A method as claimed in claim 20 wherein upon startup of a new node, the new node initially operates in a first mode and makes movements in the local clock speed based on frequency adjustment logic and subsequently operates in a second mode and makes movements in the local clock speed based on a phase locked loop.

24. A method at a master device coupled to a digital audio source device that is operable to deliver audio data to the master device at a source device rate, an infrastructure network that includes an access point that transmits beacon or probe response frames to enable at least one a client device that has a global clock and a local clock to synchronize its global clock, the method comprising:
deriving a first rate based on the rate of a master local clock included in the master device, wherein the first rate corresponds to the source device rate as assessed from the perspective of the master device's master local clock rate;
adjusting the master local clock rate depending on the relative differences in the first rate and the master local clock rate;
reading the master local clock to obtain a master local clock counter value;
reading a master global clock included in the master device to obtain a master global clock value corresponding to the read master local clock counter value; and
the master device sending data to at least one slave device that is a client device of the access point, the sent data providing to a receiving slave device data sufficient to determine the difference between the master local clock reading and the corresponding master global clock reading, such that each receiving playback unit can use the received data, the time of receipt of the received data according to the receiving playback unit's local clock, and the receiving playback unit's local global clock counter value to adjust the slave device's local clock's frequency to synchronize to the masters local clock, and hence to the source device rate, such that the adjusted local clock is synchronized to the source device rate,
wherein the slave device includes a loudspeaker and is operable to playback audio through the loudspeaker.

25. A method as recited in claim 24, wherein the slave device includes a digital-to-analog converter generating a signal to drive the loudspeaker, and wherein the adjusted local clock is used to drive the digital-to-analog converter.

26. An apparatus comprising:
a master global clock;
a transceiver coupled to the master global clock, operable to be an access point of an infrastructure network or a client device, and further operable if an access point, to send a beacon or a probe response frame, such that a client device that has a client global clock can synchronize its global clock to the master global clock;
a master local clock configured to provide a master local clock counter value when read; and
logic coupled to the transceiver, master local clock, and master global clock configured to cause the master global clock to read when the master local clock is read to provide a corresponding master global clock value, the logic further configured to cause the transceiver to send data to at least one slave device, the data sufficient for a receiving slave device to determine the difference between the master local clock reading and the corresponding master global clock reading, such that each receiving slave device that is a playback unit can use the received data, the receiving playback unit's local clock, and the receiving playback unit's local global reading to adjust the slave device's local clock's frequency to synchronize to the masters local clock, such that the adjusted local clock is synchronized to the master's local clock,
wherein each slave device is a playback unit that includes a respective loudspeaker and is operable to playback audio through the respective loudspeaker.

27. An apparatus comprising:
a global clock;
a transceiver coupled to the global clock, operable to be a client device of an access point of an infrastructure network, further operable to receive one or more beacon or probe response frames from the access point, and further operable to synchronizing the global clock to a master global clock of a master device in the infrastructure network;
a local clock;
logic coupled to the transceiver, the global clock, and the local clock operable to receive, via the transceiver, data transmitted by the master device, including data sufficient to determine the difference between a master local clock counter value obtained by reading a master local clock included in the master device, and a master global clock value corresponding to the read master local clock counter value, the master global clock value obtained by reading the global clock of the master device, the logic further operable to read the value of a client local clock, read the value of the client global clock; and adjust the client device's local clock's frequency to obtain an adjusted client local clock signal synchronized to the master local clock, such that the adjusted local clock signal is synchronized to the master device's master local clock; and an amplifier coupled to the transceiver and operative to amplify an audio signal for playback through a loudspeaker.

28. An apparatus as recited in claim 27, further comprising one or more elements for video playback.

29. An apparatus as recited in claim 27, further comprising a digital phase locked loop including:

a phase error determiner to determine the phase error between the master local clock and the adjusted client local clock signal;

a low pass filter coupled to the phase error determiner;

a signal-controlled oscillator coupled to the low pass filter having a control signal input coupled to the output of the low pass filter, and operable to generate the adjusted client local clock signal output, such that the adjusted local clock signal is phase synchronized to the master local clock of the access point.

30. An apparatus as recited in claim 29, wherein the digital phase locked loop is a Type 2, second order digital phase locked loop.

31. An apparatus as recited in claim 29, further comprising:

a digital-to-analog converter coupled to the transceiver, to the digital phase locked loop, and to the input of the amplifier, and operable to convert digital to analog at a rate determined by the adjusted local clock signal.

* * * * *